United States Patent
Leyh

(10) Patent No.: US 11,955,813 B2
(45) Date of Patent: Apr. 9, 2024

(54) CHARGED PARTICLE BEAM POWER TRANSMISSION SYSTEM

(71) Applicant: GOOGLE LLC, Mountain View, CA (US)

(72) Inventor: Gregory E. Leyh, Brisbane, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/627,469

(22) PCT Filed: May 6, 2019

(86) PCT No.: PCT/US2019/030927
§ 371 (c)(1),
(2) Date: Dec. 30, 2019

(87) PCT Pub. No.: WO2020/226618
PCT Pub. Date: Nov. 12, 2020

(65) Prior Publication Data
US 2022/0069628 A1 Mar. 3, 2022

(51) Int. Cl.
H02J 50/20 (2016.01)
H02N 3/00 (2006.01)
H05H 15/00 (2006.01)

(52) U.S. Cl.
CPC ............. *H02J 50/20* (2016.02); *H02N 3/00* (2013.01); *H05H 15/00* (2013.01)

(58) Field of Classification Search
None
See application file for complete search history.

(56) References Cited

U.S. PATENT DOCUMENTS

| 3,452,225 A | * | 6/1969 | Gourdine | ............... H02N 3/00 |
| | | | | 310/11 |
| 3,886,399 A | * | 5/1975 | Symons | ............... G21K 1/08 |
| | | | | 307/151 |
| 4,314,192 A | * | 2/1982 | Caro | ............... H02K 44/08 |
| | | | | 307/151 |

(Continued)

FOREIGN PATENT DOCUMENTS

| CN | 103683444 | | 3/2014 | |
| CN | 113812083 A | * | 12/2021 | ............. H02J 50/20 |
| WO | WO 2015/067467 | | 5/2015 | |

OTHER PUBLICATIONS

Highly Sensitive Diode conberts microwaves to usable electricity—Tech briefs Dec. 10, 2019 webreport.*

(Continued)

*Primary Examiner* — Srinivas Sathiraju
(74) *Attorney, Agent, or Firm* — Fish & Richardson P.C.

(57) ABSTRACT

In one exemplary aspect, the subject matter described in this specification can be embodied in an energy extraction system that includes a decelerator cavity coupled to a transport line for a charged particle beam and an energy conversion device coupled to the decelerator cavity. The decelerator cavity is configured to extract energy from the charged particle beam traveling through the decelerator cavity as RF energy. The energy conversion is configured to convert the RF energy into electrical current and supply the electrical current to an electric power grid. The charged particle beam includes charged particles with individual rest masses greater than the rest mass of an electron.

13 Claims, 8 Drawing Sheets

(56) References Cited

U.S. PATENT DOCUMENTS

| | | | | |
|---|---|---|---|---|
| 4,392,080 A * | 7/1983 | Maschke | ............ | H05H 9/00 |
| | | | | 315/5 |
| 4,401,918 A * | 8/1983 | Maschke | ............ | H01J 23/083 |
| | | | | 315/5 |
| 6,593,539 B1 * | 7/2003 | Miley | ............ | G21B 1/03 |
| | | | | 376/127 |
| 6,611,106 B2 * | 8/2003 | Monkhorst | ............ | H05H 1/14 |
| | | | | 315/111.41 |
| 6,852,942 B2 * | 2/2005 | Monkhorst | ............ | G21B 1/11 |
| | | | | 219/121.36 |
| 7,119,491 B2 * | 10/2006 | Rostoker | ............ | H05H 1/03 |
| | | | | 315/111.21 |
| 7,230,201 B1 * | 6/2007 | Miley | ............ | G21B 1/03 |
| | | | | 376/127 |
| 7,317,192 B2 * | 1/2008 | Ma | ............ | H05H 15/00 |
| | | | | 250/492.1 |
| 7,710,007 B2 * | 5/2010 | Liang | ............ | G21B 1/23 |
| | | | | 315/111.21 |
| 8,537,958 B2 * | 9/2013 | Laberge | ............ | H05H 3/06 |
| | | | | 376/121 |
| 8,581,523 B2 * | 11/2013 | Gall | ............ | H05H 13/02 |
| | | | | 315/501 |
| 8,598,813 B2 * | 12/2013 | Joshkin | ............ | H05H 7/02 |
| | | | | 307/106 |
| 8,878,056 B2 * | 11/2014 | Schachter | ............ | H01L 31/052 |
| | | | | 310/305 |
| 9,072,156 B2 * | 6/2015 | Caporaso | ............ | H05H 9/005 |
| 9,265,137 B2 * | 2/2016 | Rostoker | ............ | H05H 1/16 |
| 9,424,955 B2 * | 8/2016 | Laberge | ............ | G21B 3/008 |
| 9,591,740 B2 * | 3/2017 | Belchenko | ............ | H05H 3/02 |
| 9,929,667 B2 * | 3/2018 | Smedley | ............ | H02M 1/4241 |
| 10,811,144 B2 * | 10/2020 | Laberge | ............ | G21B 1/057 |
| 11,335,467 B2 * | 5/2022 | Yang | ............ | H05H 1/02 |
| 2003/0214263 A1 * | 11/2003 | Monkhorst | ............ | G21B 1/11 |
| | | | | 219/121.36 |
| 2009/0310731 A1 * | 12/2009 | Burke | ............ | H05H 7/06 |
| | | | | 376/100 |
| 2010/0002823 A1 * | 1/2010 | Monkhorst | ............ | G21D 7/00 |
| | | | | 376/121 |
| 2010/0209335 A1 * | 8/2010 | Mills | ............ | B01J 19/126 |
| | | | | 422/186.04 |
| 2010/0276000 A1 * | 11/2010 | Schachter | ............ | H01J 45/00 |
| | | | | 136/252 |
| 2011/0176648 A1 * | 7/2011 | Rowland | ............ | H05H 3/06 |
| | | | | 376/114 |
| 2013/0163707 A1 * | 6/2013 | Habs | ............ | G21G 1/12 |
| | | | | 376/157 |
| 2016/0045841 A1 * | 2/2016 | Kaplan | ............ | C01B 32/05 |
| | | | | 429/49 |
| 2017/0025967 A1 * | 1/2017 | Smedley | ............ | H02J 3/38 |
| 2017/0135194 A1 * | 5/2017 | Belchenko | ............ | H05H 3/02 |
| 2018/0256919 A1 * | 9/2018 | Shen | ............ | A61N 5/1043 |
| 2019/0250582 A1 * | 8/2019 | Jones | ............ | H02K 11/215 |
| 2021/0060358 A1 * | 3/2021 | Tantawi | ............ | H05H 7/02 |
| 2022/0069628 A1 * | 3/2022 | Leyh | ............ | H05H 15/00 |
| 2023/0085966 A1 * | 3/2023 | Parekh | ............ | G21H 1/04 |
| | | | | 376/156 |

OTHER PUBLICATIONS

PCT International Preliminary Report on Patentability in International Application No. PCT/US2019/030927, dated Nov. 18, 2021, 8 pages.

EIA.gov [online], Data on Electricty Transmission and Distribution Losses, published on Nov. 19, 2009, retrieved on Mar. 3, 2020, retrieved from URL<https://www.eia.gov/tools/faqs/faq.php?id=105&t=3>, 2 pages.

International Search Report and Written Opinion in International Application No. PCT/US2019/30927, dated Jul. 26, 2019, 9 pages.

Lee, Shyh-Yuan. Accelerator physics. World scientific publishing, 2018.

Paris et al., "Present limits of very long distance transmission systems", International Conference on Large High Electric Systems, Aug. 1984, 9 pages.

Sands, "The Physics of Electron Storage Rings: An Introduction", Prepared for the US Atomic Energy Commission Under Contract No. AT(04-3)-515, Nov. 1970, 190 pages.

U.S. Nuclear Regulatory Commission. (May 19, 2011). Operating Nuclear Power Reactors. Retrieved from http://www.nrc.gov/info-finder/reactor/.

EP Extended Search Report in European Appln. No. 19927934.0, dated Sep. 29, 2022, 10 pages.

Gao et al., "Design and testing of a 7.8 GHz power extractor using a cylindrical dielectric-loaded waveguide," Physical Review Special Topics—Accelerators and beams, Apr. 1, 2008, 11(4):1-10.

Shibata et al., "Analytical experiment of time evolution of deceleration effect in traveling wave direct energy converter using dual-frequency modulation," Plasma and Fusion Research, Feb. 12, 2019, 14(2405027):1-5.

Office Action in Chinese Appln. No. 201980096189, dated Feb. 1, 2024, 7 pages (with English translation).

* cited by examiner

CHARGED PARTICLE BEAM POWER TRANSMISSION SYSTEM

CROSS-REFERENCE TO RELATED APPLICATIONS

This application is a U.S. National Stage Application under 35 U.S.C. § 371 of International Application No. PCT/US2019/030927, filed May 6, 2019. The entire contents of the foregoing application is hereby incorporated by reference.

BACKGROUND

Renewable energy sources such as solar and wind power have grown significantly over the past decade, and continue to grow at an accelerating pace. Many new energy power generations sites such as solar, wind and nuclear power plants are being built further away from populated areas. Furthermore, intermittent sources of power, such as wind and solar often produce power at times of the day when the local spot price of electricity is at its lowest. Current copper based electrical power transmission lines are limited in range, typically spanning only 100's of miles in length. Accordingly, improvements in energy transfer systems are desirable.

SUMMARY

In general, the disclosure relates to a long distance power transmission system that employs a charged particle beam to transfers energy throughout the system. A first general aspect of the subject matter described in this specification can be embodied in an energy extraction system that includes a decelerator cavity coupled to a transport line for a charged particle beam and an energy conversion device coupled to the decelerator cavity. The decelerator cavity is configured to extract energy from the charged particle beam traveling through the decelerator cavity as RF energy. The energy conversion is configured to convert the RF energy into electrical current and supply the electrical current to an electric power grid. The charged particle beam includes charged particles with individual rest masses greater than the rest mass of an electron. This and other implementations can each optionally include one or more of the following features.

In some implementations, the charged particles are protons.

Some implementations include a control system configured to selectively couple and decoupled the decelerator cavity with the charged particle beam in response to electrical power demand of an electrical load coupled to the energy extraction system by selectively tuning and detuning the decelerator cavity to a resonant frequency of the charged particle beam.

Some implementations include a high voltage DC to AC converter coupled to the energy conversion device.

Some implementations include a second decelerator cavity spaced at a distance from the decelerator cavity along the transport line and a second energy conversion device coupled to the second decelerator cavity, where an output of the second energy conversion device is coupled to an output of the energy conversion device. Such implementations further include a control system configured to alternately couple and decoupled the decelerator cavity and the second decelerator cavity with the charged particle beam to produce an AC electrical current output signal. In some implementations, the AC electrical current output signal is a 60 Hz AC signal. In some implementations, the AC electrical current output signal is a 50 Hz AC signal. In some implementations, the control system is configured to couple the decelerator cavity with the charged particle beam and decouple the second decelerator cavity from the charged particle beam during a first half of a cycle period, and decouple the decelerator cavity from the charged particle beam and couple the second decelerator cavity with the charged particle beam during a second half of the cycle period.

In some implementations, the energy conversion device includes a magnetron. In some implementations, the energy conversion device includes an RF solid state diode. In some implementations, the decelerator cavity includes a microwave cavity resonator.

Another general aspect can be embodied in a charged particle beam energy transmission system that includes a closed loop transport line for a charged particle beam, a charged particle injector coupled to the closed loop transport line at a first location, an energy insertion system coupled to the closed loop transport line at a second location, and an energy extraction system coupled to the closed loop transport line at a third location. The energy insertion system is configured to add energy to the charged particle beam from a an electrical power source. The energy extraction system is configured to convert energy extracted from the charged particle beam to electrical current and to supply the electrical current to an electric power grid coupled to the energy extraction system. The charged particle beam includes charged particles with individual rest masses greater than the rest mass of an electron. This and other implementations can each optionally include one or more of the following features.

In some implementations, the energy extraction system includes an array of decelerator cavities coupled in series to the closed loop transport line. In some implementations, the energy extraction system includes a control system configured to selectively couple and decoupled decelerator cavities in the array with the charged particle beam in response to electrical power demand from the electric power grid by selectively tuning and detuning the decelerator cavities to a resonant frequency of the charged particle beam.

In some implementations, the charged particles are protons.

In some implementations, the energy extraction system includes a decelerator cavity coupled to a transport line for a charged particle beam and an energy conversion device coupled to the decelerator cavity. The decelerator cavity is configured to extract energy from the charged particle beam traveling through the decelerator cavity as RF energy. The energy conversion device is configured to convert the RF energy into electrical current and supply the electrical current to the electric power grid.

In some implementations, the energy conversion device includes a magnetron.

In some implementations, the decelerator cavity includes a microwave cavity resonator.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, the disclosure relates to a long distance power transmission system that employs a charged particle beam to transfers energy throughout the system. More specifically, the transmission system includes a closed loop charged particle transport line that conveys a charged particle beam between energy insertion and energy extraction sites distributed along the transport line. The charged particle beam can be used to convey energy over great distances with energy losses that are substantially less than typical copper electrical transmission lines. For example, a charged particle energy transmission system can convey energy from power generation sites that are located greater distances away from areas of high energy demand (e.g., cites) with substantially less power loss. Moreover, in some cases, charged particle energy transmission systems may permit power generation sites (e.g., nuclear reactors, solar farms, wind farms, etc.) to be located further away from energy consumers. In some examples, a charged particle energy transmission system can convey energy across or between continents to provide power from geographic locations of greater power generation ability to areas of high power need.

Energy insertion sites can include particle beam energy insertion systems that are coupled to an electric power generation system (e.g., a renewable energy power system, a nuclear power plant, or a fossil fuel power plant). An energy insertion system receives electrical energy from a power plant and converts the electrical energy into particle beam energy. For example, the energy insertion system can provide energy to a particle beam circulating in a charged particle transport line through cavity resonators that employ electromagnetic energy to accelerate the particles in the beam.

Energy extraction sites can include particle beam energy extraction systems that are coupled to an electric power grid (e.g., near a city). An energy extraction system extracts energy from the particle beam and converts the extracted energy into electrical energy. For example, an energy extraction system extracts energy from the particle beam as the beam decelerates through the energy extraction system and is converted to electromagnetic energy. The energy extraction system can convert the electromagnetic energy to electrical current for supply to an electrical power grid.

The charged particle beam can be formed of positive or negatively charged particles, e.g., protons, negatively charged ions, or positively charged ions. The charged particle beam is generally formed from charged particles that have a rest mass greater than that of an electron. For instance, using particles heavier than an electron can diminish synchrotron radiation losses while permitting the transport line to include relatively tight turn radii (e.g., radii on the order of 100's of meters or less) that may be required to traverse varied geographic topologies.

Figure 1:
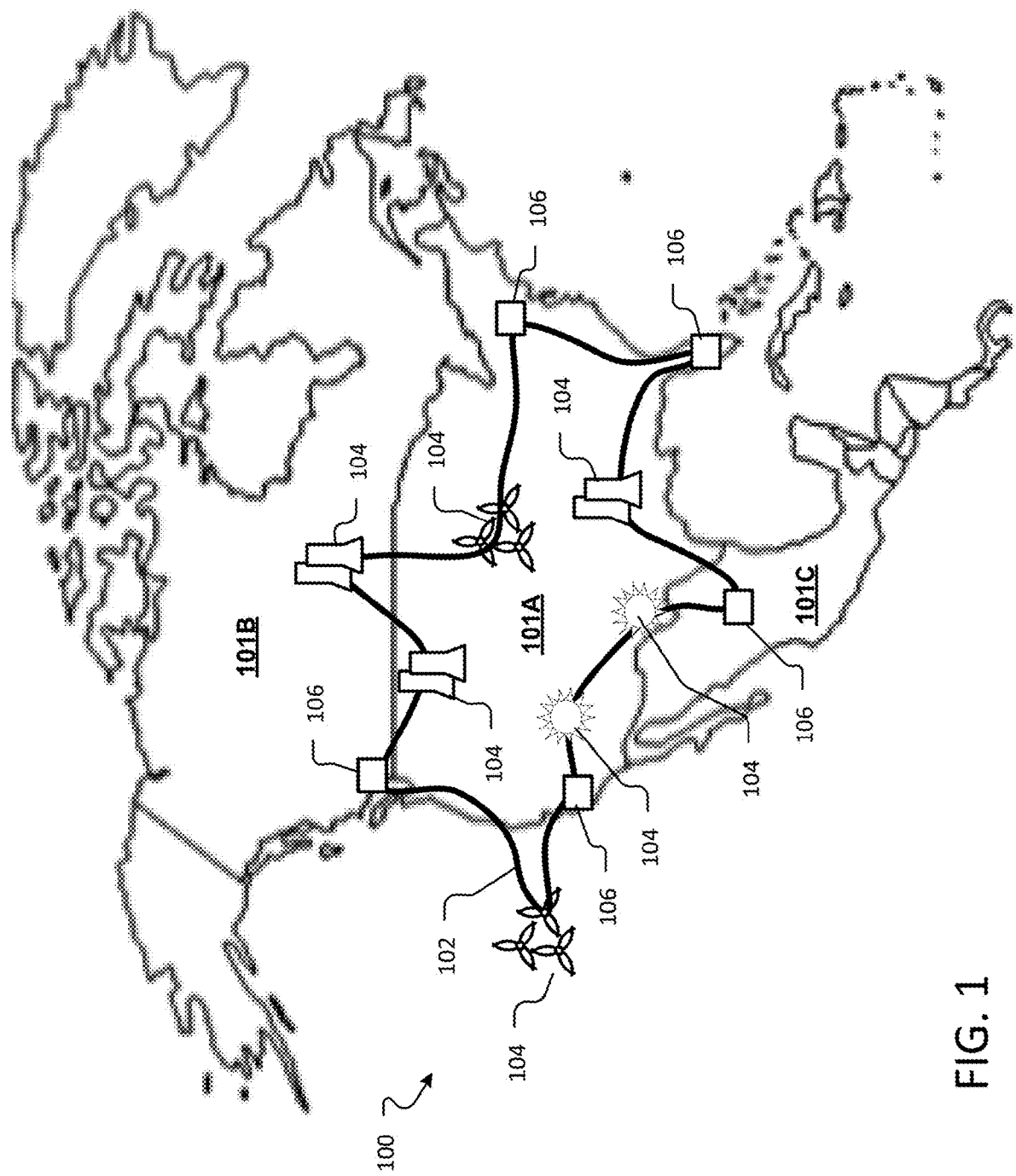
FIG. 1 is a diagram of an exemplary charged particle power transmission system.

FIG. 1 depicts a diagram of an exemplary charged particle power transmission system 100. The charged particle power transmission system 100 includes a closed loop charged particle transport line 102 that interconnects energy insertion sites 104 and energy extraction sites 106 across one or more geographic regions 101A-101C. For example, a charged particle power transmission system 100 can be constructed to convey energy produced at traditional or renewable energy power stations to electrical loads (e.g., city power grids) across a country or internationally. For example, a charged particle power transmission system 100 can be used to convey electrical power throughout North America. The charged particle power transmission system 100 may collect power from multiple power generation sites in the United States, Canada, and Mexico; and transfer the energy to various cities throughout North America.

The charged particle power transmission system 100 conveys energy by a beam of charged particles traveling at relativistic speeds through the charged particle transport line 102. The charged particle beam can be accelerated to energies in the tera-electron volts carrying multiple TW of power. The charged particle beam is made up of either positively or negatively charged particles that are heavier than an electron. For instance, the charged particle beam can be formed of protons or charged ions that have a rest mass greater than that of an electron. The use of charged particles that are heavier than an electron permits the transport line 102 to be turned at relatively tight curve radii (e.g., radii on the order of 100's of meters or less) without incurring the substantial synchrotron radiation losses that are characteristic of electrons. Moreover, the use of tighter curve radii than permitted by electrons may be necessary in order to accommodate the relatively arbitrary transport path that would be needed for such a system. In other words, tight curve radii (similar to those used in railroad track design) may be required to accommodate the arbitrary changes in topography as a transport line traverses various geographic features such as mountains and valleys, and to interconnect power generation sites and electrical load sites that do not lie on an elliptical path.

The beam of charged particles is made up of trains of particle bunches. Charged particles are bunched at an operating frequency of the charged particle transmission system 100. The operating frequency is determined by a driving frequency used to accelerate the particles at the energy insertion sites 104. For example an operating frequency of the charged particle power transmission system 100 can be between 30 to 300 MHz. Each particle bunch is approximately separated by the period of the operating frequency. The trains of particle bunches are separated by longer periods of time. Separation of the particle bunches into bunch trains is a safety precaution that permits the particle beam to be redirected out of the charged particle transport line 102 and into a safety beam dump by beam safety systems (explained in more detail below) in the event of an emergency.

Figure 2:
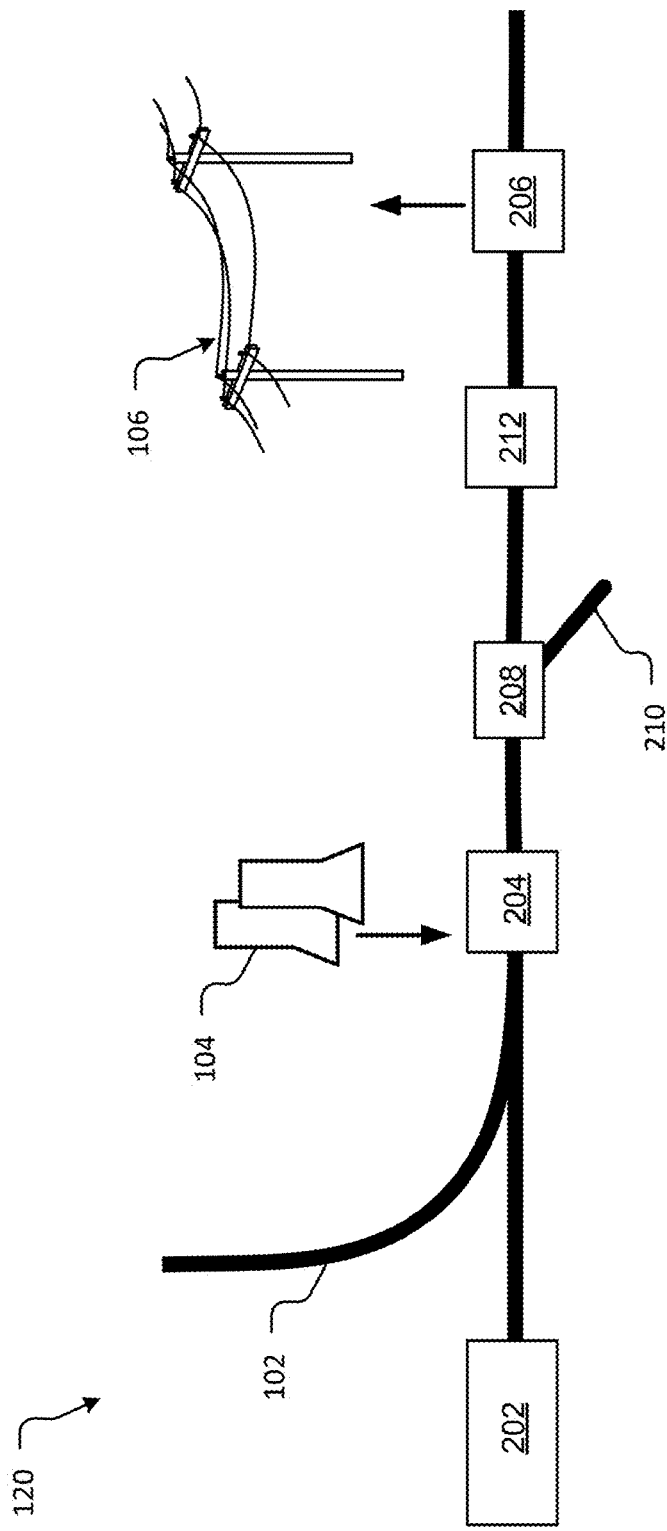
FIG. 2 is a block diagram of a section of the charged particle power transmission system of FIG. 1.

FIG. 2 is a block diagram of a section 200 of the charged particle power transmission system of FIG. 1. As illustrated in FIG. 2 the charged particle power transmission system 100 includes a charged particle injector 202, energy insertion systems 204, energy extraction systems 206, beam safety systems 208, and beam re-bunching stations 212.

Charged particle injector 202 generates the beam of charged particles that form the foundation of the charged particle power transmission system 100. Charged particle injector 202 continues to generate bunches of charged particles for the system 100 during its operation to replace particle as they decay over time. Charged particle injector 202 can be, for example, a low rate particle injector. For example, charged particle injector 202 can include a particle source and a linear accelerator. The source, (e.g., a proton source) generates free charged particles for use by the system 100 and the linear accelerator accelerates and bunches the particles for entry into the main transport line 102. In some examples, the charged particle injector 202 can include a booster, for example, a fast cycling synchrotron to further accelerate the particles prior to entry in the main transport line 102.

Energy insertion systems 204 add energy to the charged particle beam from power generation sites 104 such as conventional or renewable energy power plants. Energy insertion systems 204 convert electrical energy generated by a power plant to kinetic energy of the charged particle beam. Energy insertion systems 204 can also be considered as accelerator systems because they use the electrical energy generated from a power plant to add energy to the transport system 100 by accelerating the charged particle beam. Energy insertion systems 204 can include accelerator cavities coupled to high-power radiofrequency (RF) sources, e.g., microwave or radiowave sources. The RF sources (e.g., high power magnetrons, klystrons, tetrodes, etc.) convert electrical power from a power plant into RF power. The RF power is used to drive accelerator cavities (e.g., RF cavity resonators) that operate at the operational frequency of the charged particle power transmission system 100. The charged particle beam is accelerated by oscillating RF waves, e.g., microwaves or radiowaves, in the accelerator cavities as it passes through the accelerator cavities. In some implementations, energy insertion systems 204 can include an array of stations that each include an RF source and accelerator cavity. For example, an energy insertion system 204 can include an array of 100 MW stations that together can add 1-10 GW of power to the particle beam.

Energy extraction systems 206 remove energy from the charged particle beam and pass the extracted energy to electrical loads such as an electrical power grid 106. Energy extraction systems 206 convert the kinetic energy of the charged particle beam to electrical energy that can be transported through a local power grid 106. As described in more detail below in reference to FIGS. 4A-4D, energy extraction systems include one or more decelerator cavities that extract energy from the charged particle beam as RF energy (e.g., microwave energy). Energy extraction systems 206 then convert the RF energy to either DC or AC electrical current. In some implementations, energy extraction systems 206 can include array of stations that include a decelerator cavity and an RF energy conversion device. For example, an energy extraction system 206 can include an array of 100 MW stations that together can extract 1-10 GW of power from the particle beam. Furthermore, the energy extraction system 206 can be configured to selectively turn on or off each of the stations depending on the power draw of the electrical power grid connected to the energy extraction system 206.

Beam safety systems 208 are used to redirect the charged particle beam into a safety beam dump in the event of an emergency situation. For example, the charged particle beam may carry extremely high powers (e.g., multiple tera-Watts of power) which may cause severe damage to the transport line 102 and surrounding vicinity if the beam becomes unstable. Beam safety systems 208 are configured to safely redirect the beam into the ground where the energy can be dissipated without harm. A beam safety system 208 can include an abort kicker and a bypass path 210 to a safety beam dump. The abort kicker can include a set of electromagnets that are timed to generate a magnetic field that redirects the particle beam into the bypass path 210. The abort kicker is timed to switch on between trains of particle bunches to prevent the particle beam from impinging a sidewall of the transport line 102 as the magnetic field builds.

Beam re-bunching stations 212 can be located at intervals along the transport line 102. For example, beam re-bunching stations 212 can be located at 100 km intervals along the transport line 102. Beam re-bunching stations 212 re-bunch or refocus the beam to correct for dispersion that may occur during beam propagation. Beam re-bunching stations 212 can include unpowered resonant cavities with active resonance control.

Figure 3A:
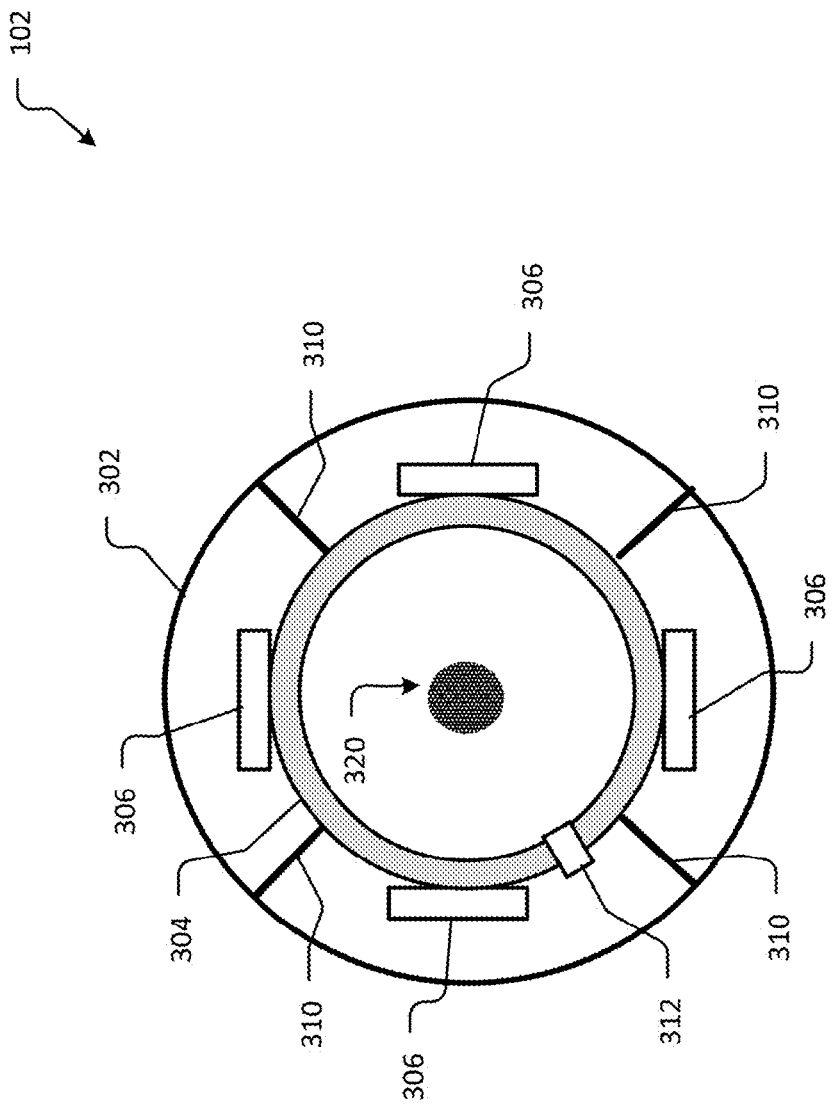
FIGS. 3A and 3B are cross-sectional diagrams of exemplary charged particle transport lines.
Figure 3B:
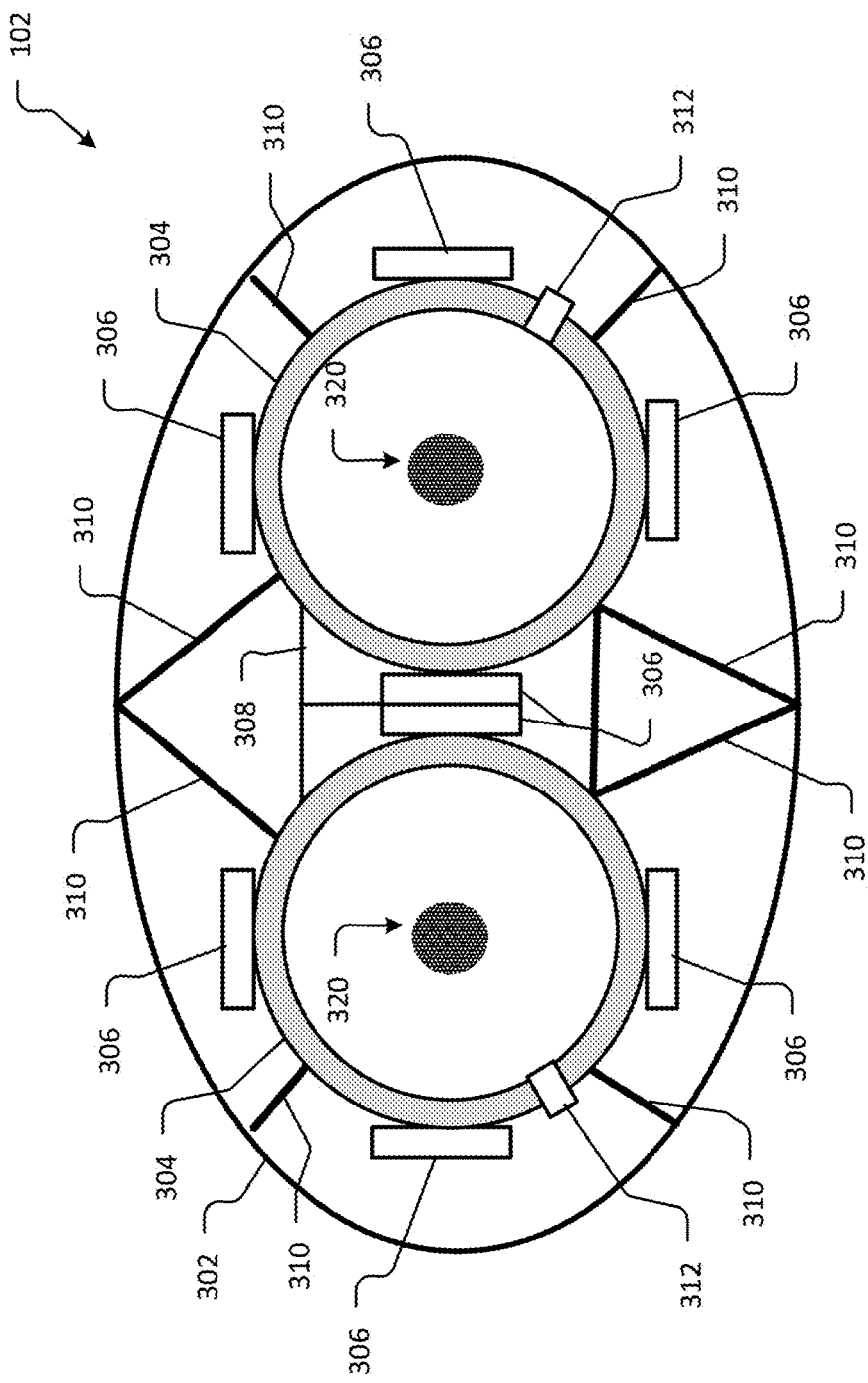

FIGS. 3A and 3B show cross-sectional diagrams of exemplary charged particle transport lines 102. FIG. 3A illustrates a cross-section of a transport line with a single charged particle tube 304. FIG. 3B illustrates a cross-section of a transport line with two charged particle tubes 304.

The transport line 102 can be constructed of an outer casing 302 that houses one or more charged particle tubes 304. A charged particle tube 304 is supported within the casing 302 by a lattice of support structures 310. In some implementations, the charged particle tube 304 has a diameter between 200 mm and 700 mm.

Magnets 306 are positioned around the charged particle tube 304. The magnets 306 can be permanent magnets or electromagnets. For example, permanent magnets are be placed along sections of the transport line 102 to focus (e.g., collimate) a beam of charged particles 320 propagating through the charged particle tube 304. In addition, permanent or electromagnets 306 are positioned asymmetrically around the charged particle tube 304 at curved sections of the transport line 102 to turn the beam of charged particles 302 around the curved section. As noted above, using charged particles that are heavier than an electron can permit the use of a relatively tight turn radii in the transport line 102 (e.g., radii on the order of 100's of meters or less).

The transport line 102 can include ion pumps 312 coupled to the charged particle tube 304. For example, ion pumps 312 can be located along portions of the charged particle tube 304 in order to maintain the charge particle tube 304 at an appropriate vacuum.

Some implementations of the transport line 102, e.g., the dual charged particle tube design of FIG. 3B, can include a rail system 308. For example, the rail system 308 can be configured for use by micro-robots to perform maintenance such as adjustments to the magnets 306 or the ion pumps 312 within the transport line 102.

Figure 4A:
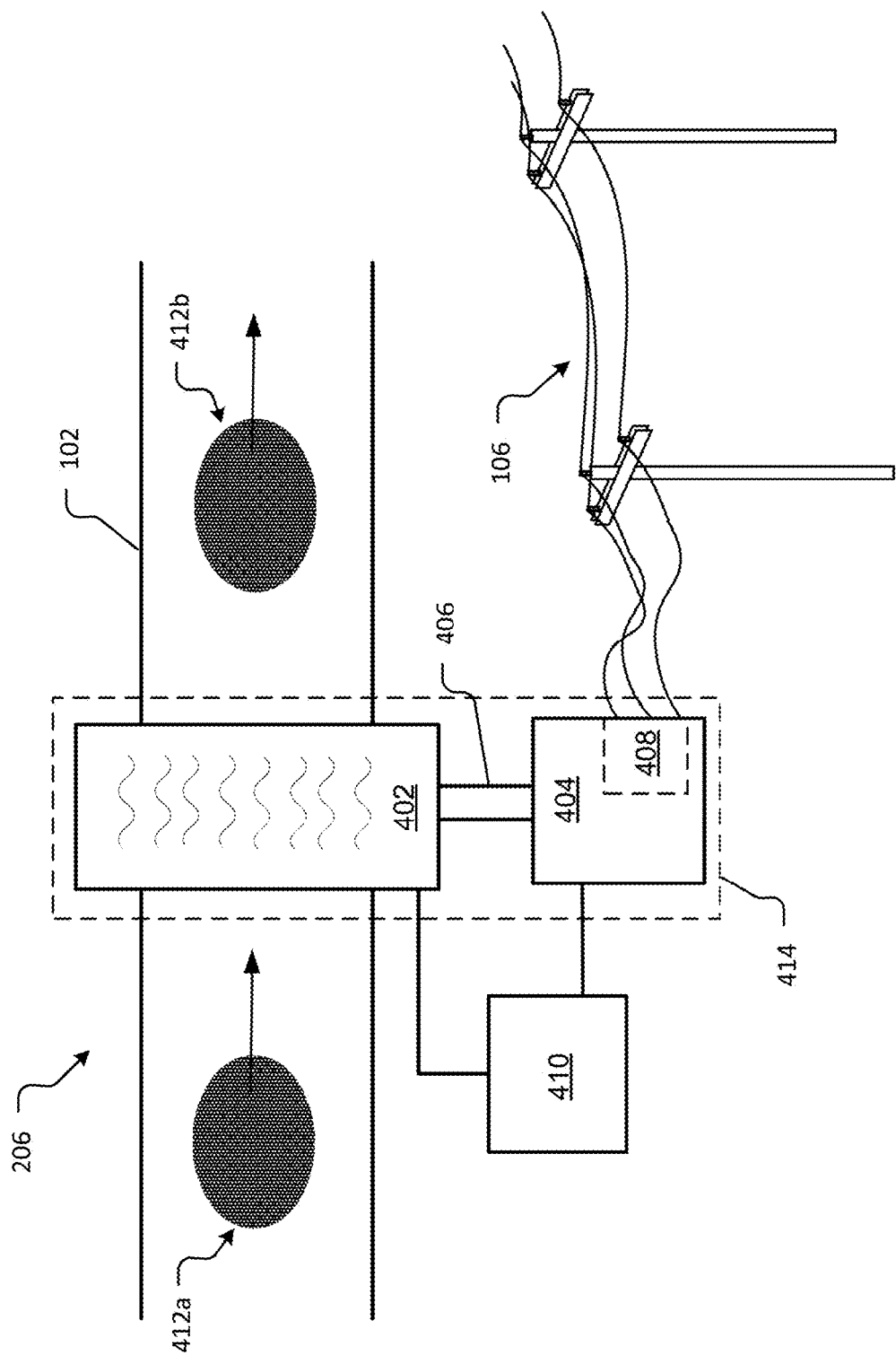
FIGS. 4A-4D are block diagrams of exemplary energy extraction systems for a charged particle power transmission system.

FIG. 4A is block diagram of an exemplary energy extraction system 206. The energy extraction system 206 includes a decelerator cavity 402 and an energy conversion device 404. The decelerator cavity 402 is coupled to the charge particle transport line 102. The energy conversion device 404 is coupled to the decelerator cavity 402 by an RF coupling device 406. For example, the RF coupling device 406 can be a waveguide or a coaxial cable. Together, a decelerator cavity-energy conversion device pair can be referred to as an energy extraction station 414. As described in more detail below, an energy extraction system 206 can include multiple energy extraction stations 414.

Decelerator cavity 402 is configured to extract energy from the charge particle beam as the beam travels through the cavity 402. Decelerator cavity 402 converts energy extracted from the beam to RF energy and transfers the RF energy to the energy conversion device 404. For example, the decelerator cavity 402 can be an RF, e.g., a microwave, cavity resonator that does not increase the net energy of the beam as the beam passes through the cavity resonator. That is, the net kinetic energy of a charge particle bunch 412b exiting the decelerator cavity 402 will be less than the net kinetic energy of a charged particle bunch 412a that before entering the cavity. For example, the decelerator cavity 402 can be tuned to the resonant frequency of the charge particle beam. As a charge particle bunch passes through the decelerator cavity 402 it interacts with the cavity generating RF energy at the resonant frequency of the cavity. Because there is no input RF energy applied to the decelerator cavity 402 (unlike an accelerator cavity), the charge particle beam decelerates as it passes through the decelerator cavity 402 and the changing kinetic energy of the beam is converted to RF energy in the cavity.

In some implementations, the decelerator cavity 402 can be a tunable cavity resonator. For example, the cavity resonator can have active resonance control. For example, the decelerator cavity 402 can be a cavity resonator that has an active dielectric material inside the cavity. The dielectric can be reconfigurable by the application of an electric charge, e.g., a control signal, that tunes and de-tunes the cavity resonator to the operational frequency of the charged particle beam. In other words, tuning the cavity resonator effectively turns the cavity resonator "on" coupling it to the charged particle beam, and thus extracting energy from the charge particle beam as it passes through the cavity; and de-tuning tuning the cavity resonator effectively turns the cavity resonator "off" decoupling it from the charged particle beam, and thus allowing the charge particle beam to pass through the cavity substantially unchanged.

Energy conversion device 404 receives RF energy from the decelerator cavity 402. Energy conversion device 404 is configured to convert the RF energy received from decelerator cavity 402 into electrical current. For example, energy conversion device 404 can include, but is not limited to, a magnetron, a klystron, a tetrode, or RF solid state diodes (e.g., RF PIN diodes). It's Energy conversion device 404 converts the RF energy into a DC electrical current. In some implementations, energy conversion device 404 can supply the DC current directly to a DC power grid 106. In some implementations, energy conversion device 404 includes a high-voltage DC/AC converter 408. For example high-voltage DC/AC converter 408 can be a high-voltage chopper station. For example, energy conversion device 404 can be configured to output AC electrical current as a 60 Hz for a 50 Hz AC signal. The AC electrical signal is then output to an electrical load such as an AC power grid 106.

Energy extraction system 206 can include a control system 410. Control system 410 can include, but is not limited to, control circuitry such as a microprocessor or microcontroller or a computing system including one or more computing devices. Control system 410 controls the operations of decelerator cavity 402 and energy conversion device 404. For example, control system 410 can be used to turn the decelerator cavity 402 "on" or "off" in response to electrical power demand from the power grid 106. For example, control system 410 can supply control signals to the decelerator cavity 402 to selectively tune or de-tune the cavity to the resonant frequency of the charged particle beam.

Figure 4B:
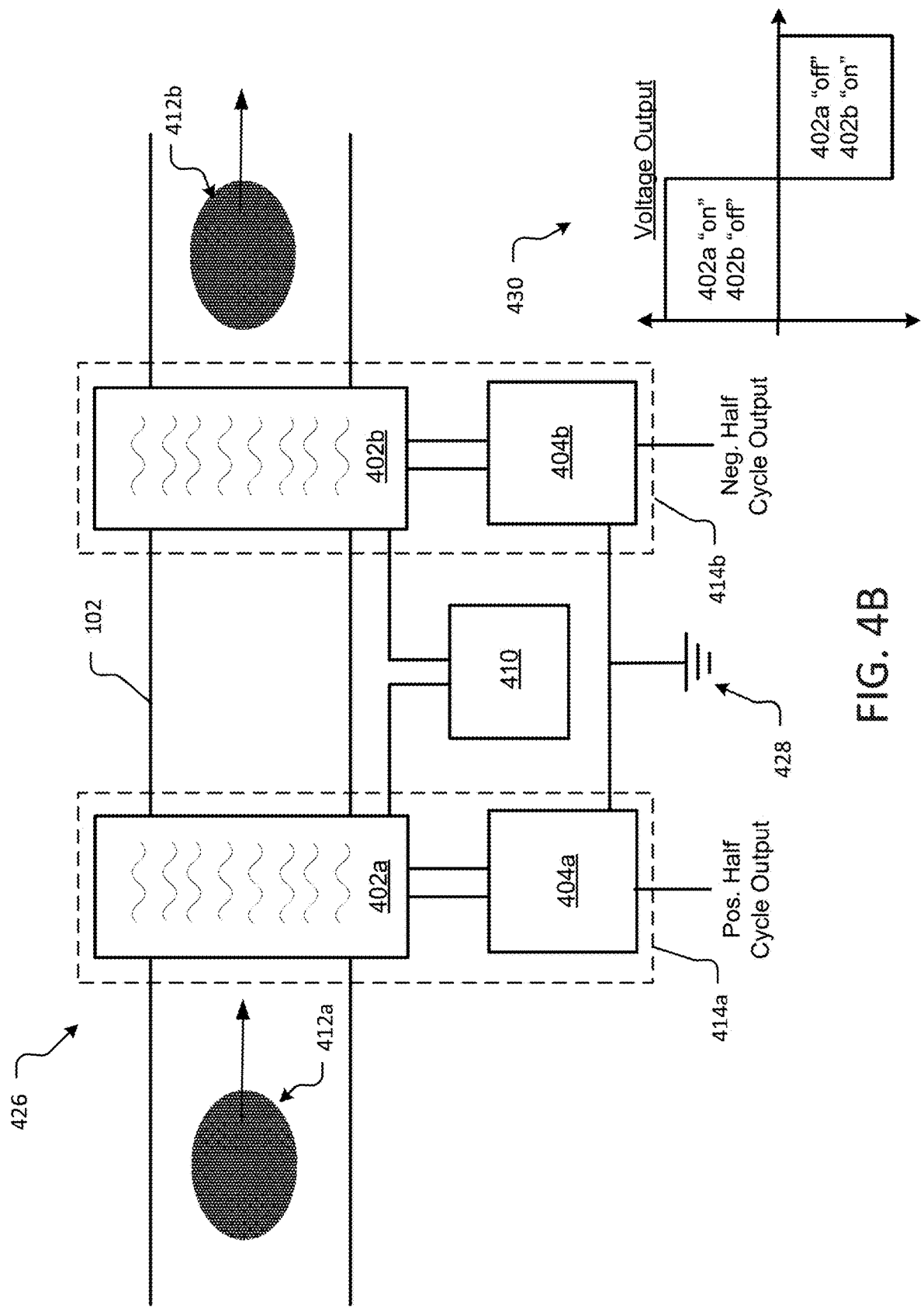

FIG. 4B is block diagram of an exemplary energy extraction system 426 configured to generate an AC output without the use of a high voltage DC/AC converter. Energy extraction system 426 includes a pair of energy extraction stations 414a, 414b. Energy extraction station 414b includes a decelerator cavity 402b that is spaced at a distance along the transport line 102 from decelerator cavity 402a of extraction station 414a. Each energy extraction station 414a, 414b also includes a respective energy conversion device 404a, 404b. Energy conversion devices 404a and 404b are each coupled to a common electrical ground 428.

Control system 410 is configured to alternately couple and decouple the decelerator cavity 402a, 402b of each energy extraction station 414a, 414b with the charge particle beam. As illustrated by the voltage output plot 430, the decelerator cavity of each energy extraction station 414a, 414b is "on" (e.g., tuned to the particle beams operating frequency) during an opposite half cycle of an output AC waveform. For example, control system 410 couples decelerator cavity 402a to the charge particle beam during the first half cycle of an AC signal by tuning its decelerator cavity 402a to the operational frequency of the particle beam. During the same half cycle, control system 410 decouples decelerator cavity 402b from the charged particle beam by de-tuning its decelerator cavity 402b from the operational frequency of the particle beam. During the first half cycle energy extraction station 414a will provide a DC output voltage while energy extraction station 414b provides no output. During the second half cycle of an AC signal, control system 410 decouples decelerator cavity 402a from the charged particle beam and couples decelerator cavity 402b to the charge particle beam. Consequently, during the second half cycle, energy extraction station 414a will provide no output while energy extraction station 414b provides a DC output. Moreover, the respective outputs of energy extraction station 414a and 414b will have opposite polarity because their respective energy conversion devices 404a, 404b are coupled to a common ground 428. The combined output of the two energy extraction stations 414a, 414b will be an alternating square wave. Furthermore, the energy extraction system 426 can include filters (not shown) that shape the square wave output into a traditional AC output current.

Control system 410 can be configured to time the cycling of decelerator cavities to produce a 60 Hz or a 50 Hz AC output. For example, control system 410 can be configured to alternately tune indeed tune each decelerator cavity for a period of 16.7 ms to produce a 60 Hz signal or for a period of 20 ms to produce a 50 Hz signal.

Figure 4C:
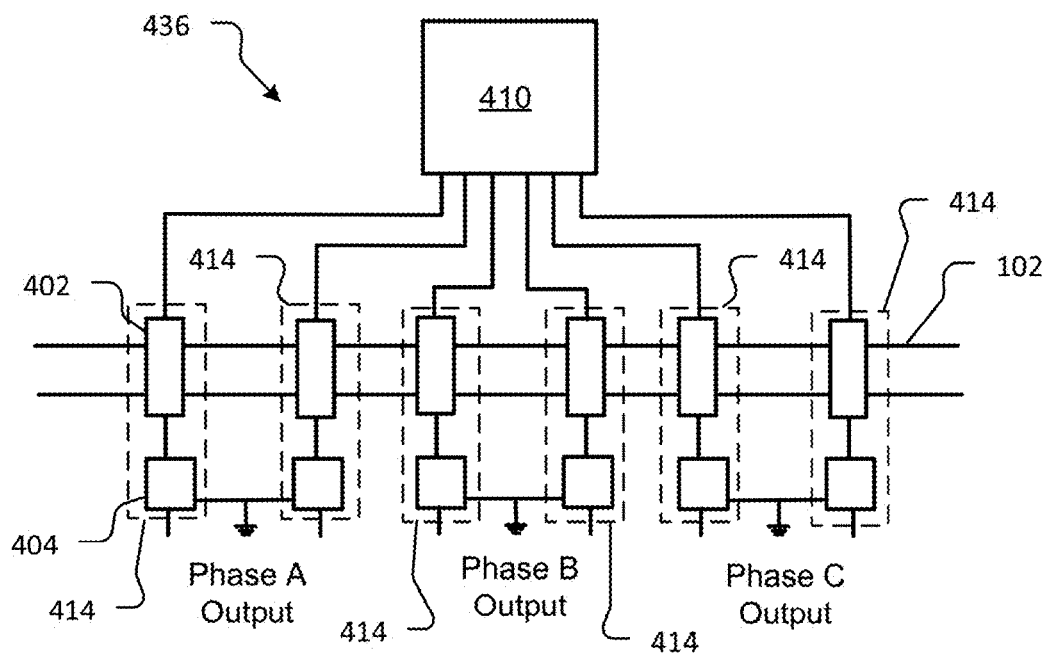

FIG. 4C is block diagram of an exemplary polyphase energy extraction system 436 configured to generate an AC output without the use of a high volt DC/AC converter. Polyphase energy extraction system 436 combines three AC energy extraction systems 426 of FIG. 4B to provide a three-phase AC output. For example, pairs of energy extraction stations 414 can be configured to output one of three phases (Phase A, Phase B, and Phase C) of a three-phase AC output. Control system 410 controls the coupling and decoupling of the respective decelerator cavities 402 to produce three AC output phases that are each shifted by 120° from each other. For example, the phase B output may be shifted by 120° from the phase A output in the phase C output may be shifted by 240° from the phase A output.

Figure 4D:
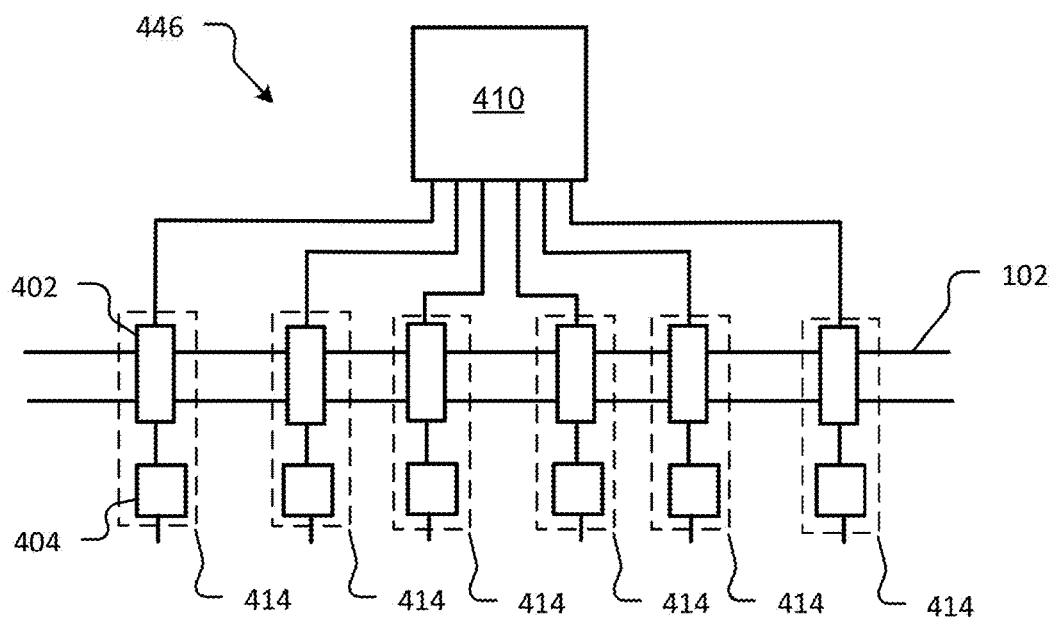

FIG. 4D is block diagram of an exemplary energy extraction system 446 that includes an array of controllable energy extraction stations 414. As noted above, an energy extraction system may employ an array of energy extraction stations 414 to provide sufficient energy output for the electrical power grid. Energy extraction system 446 is an example of such a system. For example, energy extraction system 446 includes an array of six energy extraction stations 414 each coupled to the transport line 102 in a series configuration. That is, the respective decelerator cavity 402 of each energy extraction station 414 are coupled along the transport line 102 in series. Control system 410 can be configured to selectively couple and decouple each of the decelerator cavities 402 from the particle beam in response to electrical power demand from a power grid. For example, each energy extraction station 414 may be capable of extracting 100 MW of power from the charge particle beam. If the power demand for a given electrical power grid is only 300 MW, control system 410 will turn on three of the energy extraction stations 414 and leave the remaining three off. As power demand changes, control system 410 will selectively turn on or off (e.g., couple and decouple) energy extraction stations 414 to provide a total output power that is commensurate with the power demand.

It should be understood, that while energy extraction system 446 is illustrated as only having six energy extraction stations 414, energy extraction system can include any appropriate number of energy extraction stations 414 to provide a total desired output power depending on the power output capability of each energy extraction station 414. For example, if a power grid for a given city requires 10 GW of electrical power and energy extraction system 446 that is composed of 100 MW energy extraction stations 414 would include 100 energy extraction stations 414. Furthermore, each station 414 in FIG. 4D can represent either an AC energy conversion station (e.g., as illustrated in FIG. 4B) or a three-phase energy conversion station (e.g., as illustrated in FIG. 4C). As such, an energy extraction system 446 can include an array of AC energy conversion stations (e.g., from FIG. 4B) or an array of three-phase energy conversion stations (e.g., from FIG. 4C) that are each individually controllable to be turned "off" and "on" by the control system 410 to adapt the total output power of the energy extraction system 446 to the electrical power demand of a power grid.

Figure 5:
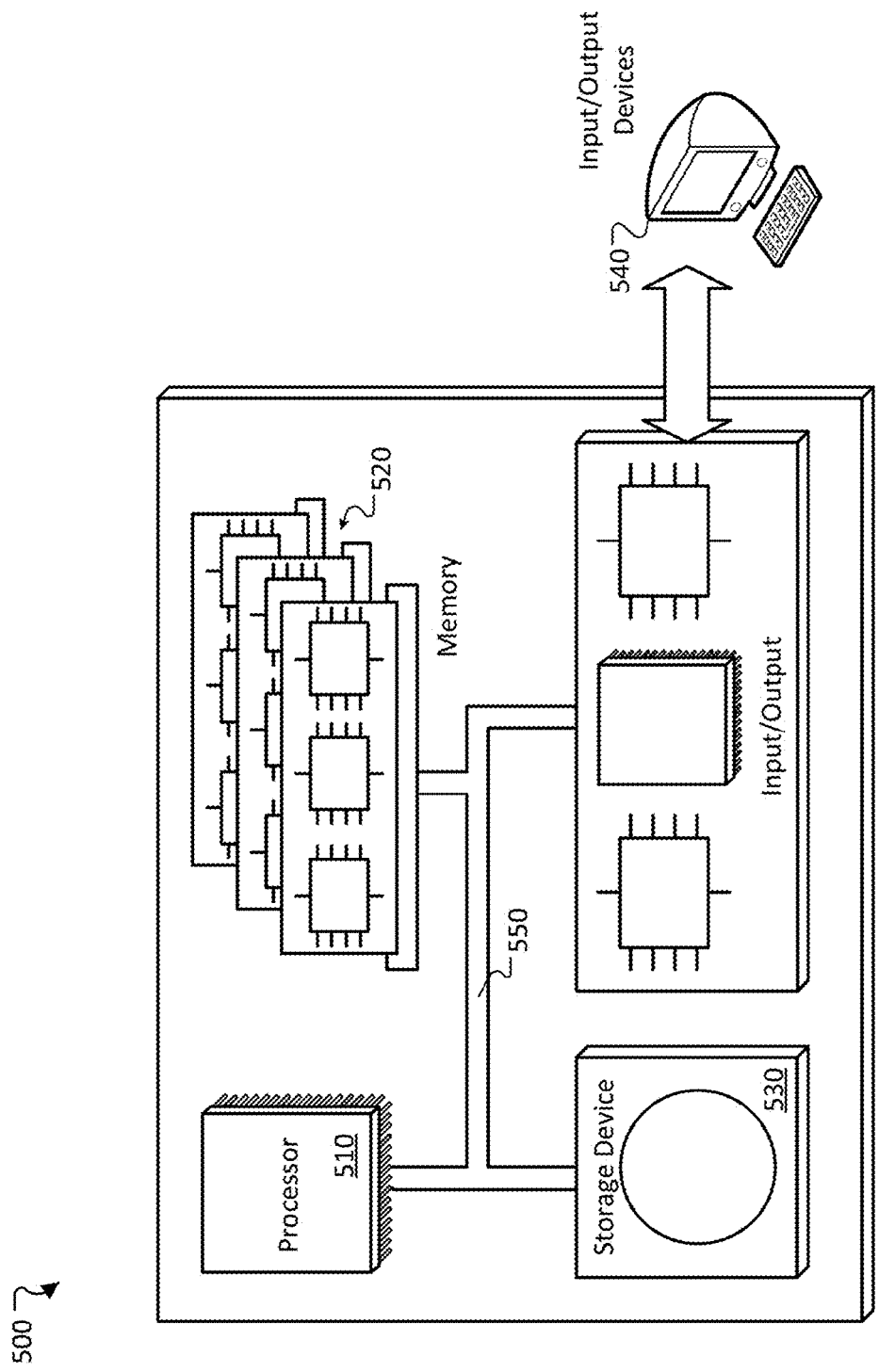
FIG. 5 depicts a schematic diagram of a computer system that may serve as a control system according to implementations of the present disclosure.

FIG. 5 is a schematic diagram of a computer system 500. For example, the system, or portions thereof, can be implemented as the control system 310 described above in reference to FIGS. 4A-4D. The system 500 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 500) and their structural equivalents, or in combinations of one or more of them. The system 500 is intended to include various forms of digital computers, such as laptops, desktops, workstations, personal digital assistants, servers, blade servers, mainframes, and other appropriate computers, including vehicles installed on base units or pod units of modular vehicles. The system 500 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transducer or USB connector that may be inserted into a USB port of another computing device.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. An energy extraction system comprising:
   a decelerator cavity coupled to a transport line for a charged particle beam, the decelerator cavity configured to extract energy from the charged particle beam traveling through the decelerator cavity as RF energy and comprising an active dielectric that, in response to a control signal, actively controls a resonance frequency of the decelerator cavity;
   an energy conversion device coupled to the decelerator cavity, the energy conversion device configured to convert the RF energy into electrical current and supply the electrical current to an electric power grid, and
   a control system configured to selectively couple and decouple decoupled the decelerator cavity with the charged particle beam in response to electrical power demand of an electrical load coupled to the energy extraction system by selectively tuning and detuning the decelerator cavity to a resonant frequency of the charged particle beam, the selectively tuning comprising:
   adjusting the control signal applied to the active dielectric to tune the decelerator cavity to a first resonance frequency that is the resonance frequency of the charged particle beam to couple the decelerator cavity to the charged particle beam; and
   further adjusting the control signal applied to the active dielectric to de-tune the decelerator cavity to a second resonance frequency that is not the resonance frequency of the charged particle beam to decouple the decelerator cavity from the charged particle beam,
   wherein the charged particle beam comprises charged particles with individual rest masses greater than the rest mass of an electron.

2. The energy extraction system of claim 1, wherein the charged particles are charged particle beam comprises protons.

3. The energy extraction system of claim 1, further comprising a high voltage DC to AC converter coupled to the energy conversion device.

4. The energy extraction system of claim 1, further comprising:
   a second decelerator cavity spaced at a distance from the decelerator cavity along the transport line; and
   a second energy conversion device coupled to the second decelerator cavity, wherein an output of the second energy conversion device is coupled to an output of the energy conversion device;
   wherein the control system is configured to alternately couple and decouple decoupled the decelerator cavity and the second decelerator cavity with the charged particle beam to produce an AC electrical current output signal.

5. The energy extraction system of claim 4, wherein the AC electrical current output signal is a 60 Hz AC signal.

6. The energy extraction system of claim 4, wherein the AC electrical current output signal is a 50 Hz AC signal.

7. The energy extraction system of claim 4, wherein the control system is configured to:

couple the decelerator cavity with the charged particle beam and decouple the second decelerator cavity from the charged particle beam during a first half of a cycle period; and decouple the decelerator cavity from the charged particle beam and couple the second decelerator cavity with the charged particle beam during a second half of the cycle period.

8. The energy extraction system of claim 1, wherein the energy conversion device comprises a magnetron.

9. The energy extraction system of claim 1, wherein the energy conversion device comprises an RF solid state diode.

10. The energy extraction system of claim 1, wherein the decelerator cavity comprises a microwave cavity resonator.

11. An energy extraction system comprising:
a decelerator cavity coupled to a transport line for a charged particle beam, the decelerator cavity configured to extract energy from the charged particle beam traveling through the decelerator cavity as RF energy and comprising an active dielectric that, in response to a control signal, actively controls a resonance frequency of the decelerator cavity;
means for converting the RF energy into electrical current and supplying the electrical current to an electric power grid, wherein the means is coupled to the decelerator cavity, and
a control system configured to selectively couple and decouple decoupled the decelerator cavity with the charged particle beam in response to electrical power demand of an electrical load coupled to the energy extraction system by selectively tuning and detuning the decelerator cavity to a resonant frequency of the charged particle beam, the selectively tuning comprising:
adjusting the control signal applied to the active dielectric to tune the decelerator cavity to a first resonance frequency that is the resonance frequency of the charged particle beam to couple the decelerator cavity to the charged particle beam; and
further adjusting the control signal applied to the active dielectric to de-tune the decelerator cavity to a second resonance frequency that is not the resonance frequency of the charged particle beam to decouple the decelerator cavity from the charged particle beam,
wherein the charged particle beam comprises charged particles with individual rest masses greater than the rest mass of an electron.

12. The energy extraction system of claim 11, wherein the means for converting the RF energy into electrical current comprises a magnetron.

13. The energy extraction system of claim 11, wherein the means for converting the RF energy into electrical current and supplying the electrical current to the electric power grid is a first means, and wherein the system further comprises:
a second decelerator cavity spaced at a distance from the decelerator cavity along the transport line; and
a second means for converting the RF energy into electrical current and supplying the electrical current to the electric power grid, wherein the second means is coupled to the second decelerator cavity, and wherein an output of the second means is coupled to an output of the first means,
wherein the control system is configured to alternately couple and decouple decoupled the decelerator cavity and the second decelerator cavity with the charged particle beam to produce an AC electrical current output signal.

* * * * *